3,258,311
PROCESS FOR FORMING SPHERICAL SILICA BEADS
Alfred J. Burzynski and Robert E. Martin, Toledo, Ohio, assignors to Owens-Illinois Glass Company, a corporation of Ohio
No Drawing. Filed Mar. 25, 1963, Ser. No. 267,786
12 Claims. (Cl. 23—182)

This invention relates to a process for bead formation. In particular, this invention relates to a process for forming uniformly small, spherical beads from alkali metal silicates.

Compounds of the formula $x\text{Na}_2\text{O} \cdot y\text{SiO}_2$ are named by International Union of Pure and Applied Chemistry rules as sodium $(x\!:\!y)$ silicates. The profound effects of traces of oxides of polyvalent metals make it difficult to define exactly the ratios of $x\!:\!y$ which correspond to water-soluble compounds. However, it is generally believed that a value of $x/y$ greater than 0.24 characterizes the water-soluble sodium silicates, and a similar generalization holds for the commercially less important silicates of lithium, potassium, rubidium, and cesium. The soluble sodium silicates have been used commercially as detergents, adhesives, in cements, sizes, coatings, for textile treatment, water treatment, oil-well drilling, roofing granules, and many other purposes.

Silica beads have found application as catalysts or catalyst supports in fixed, moving or fluidized bed systems for hydrocarbon conversions in the petroleum industry. Consequently, methods have been provided for the preparation of silica beads from water-soluble sodium silicates. The processes usually involve preparation of a suspension of acidified aqueous sodium silicate in a water-immiscible medium such as a hydrocarbon; the resultant suspension is maintained until the spheres have hardened, and they are then separated from the medium, sorted, and washed free of undesirable contaminants.

It is therefore an object of the present invention to provide a new and improved process for forming silica beads.

It is a further object to provide a method of preparing substantially spherical silica beads of relatively uniform, small size.

According to the present invention there is provided a method for forming solid, substantially spherical particles which comprises combining water; a compound of the formula $x\text{R}_2\text{O} \cdot y\text{SiO}_2$, wherein R represents an alkali metal, and $x/y$ is greater than 0.24, in a concentration equivalent to 50 millimoles to 800 millimoles of $\text{SiO}_2$ per liter; $(2N+A)$ milliequivalents of acid per liter, where N is the millimoles of $\text{R}_2\text{O}$ per liter, and A is from 0 to 4000, in which the foregoing reactant concentrations are expressed as theoretical concentrations prior to reaction; from 1 to 150 grams per liter of an emulsifying agent or surface active agent; and from 0 to 10 grams per liter of a compound of aluminum, based on the total volume of the reaction mixture. The resultant mixture is agitated at temperatures in the range of from 80 centigrade degrees below its boiling point to its boiling point at the prevailing pressure for a time of from one minute to about twelve hours to give said particles.

Reactant concentrations are expressed herein as theoretical concentrations before reaction has occurred. That is, each reactant is assumed present in the cited form in the total volume of the initial reaction mixture. Although it probably does not represent any actual condition of the reaction mixture, this mode of expression is adopted for convenience.

In a usual embodiment of the present invention, a mixture containing water; a compound of the formula $x\text{R}_2\text{O} \cdot y\text{SiO}_2$, wherein R represents an alkali metal, and $x/y$ is greater than 0.24, in a concentration equivalent to 150 millimoles to 250 millimoles of $\text{SiO}_2$ per liter; $(2N+A)$ milliequivalents of acid per liter, where N is the millimoles of $\text{R}_2\text{O}$ per liter, and A is from 1000 to 2000, in which the foregoing reactant concentrations are expressed as theoretical concentrations prior to reaction; and from 30 to 50 grams per liter of an emulsifying agent with a cloud point below the boiling point of the reaction mixture, based on the volume of the total reaction mixture, is stirred at temperatures in the range of from 80 centigrade degrees below its boiling point to its boiling point at a pressure of about one atmosphere for a time of from about 30 minutes to about 90 minutes to give spherical particles about 1 micron to 1.5 millimeters in diameter. The product beads generally decrease in size with decreased alkali metal silicate concentration, increased agitation rate, and increased emulsifier concentration, but usually are up to 1.5 millimeters in diameter; larger beads can be obtained, but they are less uniform. Similarly, beads smaller than 1 micron in diameter can be obtained, but they are usually less symmetrical.

In a preferred embodiment of the present invention, a mixture which comprises water; a sodium (1:3.36) silicate, in a concentration equivalent to 80 to 90 millimoles of $\text{SiO}_2$ per liter; $(2N+A)$ milliequivalents of acid per liter, where N is the millimoles of $\text{Na}_2\text{O}$ per liter, and A is from 1200 to 1600, in which the foregoing reactants are cited as their theoretical concentrations before reaction; and from 50 to 60 grams of the nonylphenyl ether of polyethyleneglycol, based on the total volume of the mixture, is stirred at temperatures in the range of from 80 centigrade degrees below its boiling point to its boiling point at a pressure of about one atmosphere for a time of from about 30 minutes to about 90 minutes to give substantially spherical particles about 1 micron to 1.5 millimeters in diameter.

The nature and amount of the particular emulsifier used varies with the proportions of the other reagents employed, and is best determined empirically in a given experiment by routine test. The quantity of emulsifier employed must be sufficient to protect the droplets during hardening so that they do not agglomerate to form irregular silica particles. The emulsifier must be water-soluble, and it can be nonionic, anionic, or cationic. Suitable types of emulsifiers are water-soluble salts of fatty acids; alkyl sulfates, such as sodium lauryl sulfate and sodium cetane sulfate; alkyl and alkaryl sulfonates, such as sodium alkyl naphthalene sulfonate and potassium dodecylbenzene sulfonate; polyethylene glycol lauryl ether and diethylene glycol monostearate; the condensation products of an alkylene oxide with alcohols, mercaptans, phenols or organic acids, such as the polyethylene glycol ester of abietic acid and the condensation product of n-dodecylmercaptan with ethylene oxide; sorbitan monopalmitate and sorbitan monooleate; block polymers of polypropylene glycol chains and polyethylene glycol chains with a molecular weight of at least about 2000 with about equal portions of the molecular weight in the polypropylene glycol and polyethylene glycol portions; cetyldimethylethylammonium bromide and cetyldimethylbenzylammonium chloride; and the nonylphenyl ether of polyethylene glycol. It will be understood that the use of a particular emulsifier is obviated if its structural characteristics which confer emulsive ability are destroyed in the reaction mixture. Thus, alkali metal salts of fatty acids are not useful in markedly acidic solutions, since they are converted largely to the unionized form of the acid, which is not an emulsifying agent.

Suitable acids for the purposes of the present invention are organic and inorganic acids, such as sulfuric acid, nitric acid, hydrochloric acid, acetic acid, oxalic acid, and benzenesulfonic acid.

The following examples illustrate the procedure of the present invention. It will be apparent from these examples and from the foregoing description that the function of the alkali metal component of the cited alkali metal silicates is merely to render them water soluble; therefore the use of a particular alkali metal is not necessary.

*Examples 1–31*

Concentrations of constituents used in the experiments which correspond to Examples 1 to 31 are indicated in Table I; the term "per liter" in the table means per liter of total initial reaction mixture. The concentrations of sodium silicate and sulfuric acid given as $SiO_2$, $Na_2O$, and $H_2SO_4$ in this way are referred to below as theoretical concentrations prior to reaction. Probably none of these entities is present, since each is unstable with respect to its ionization, hydrolysis, or neutralization products under these conditions; this mode of expression is adopted for convenience. The symbol $N$ represents the theoretical concentration of $Na_2O$ prior to reaction in millimoles of $Na_2O$ per liter of initial reaction mixture. The theoretical concentration of sulfuric acid in milliequivalents per liter of initial reaction mixture is designated as $(2N+A)$, so that the value of $A$ then becomes an approximate measure of the acid in excess of that required theoretically to complete the reaction:

$$Na_2O + H_2O = 2NaOH$$

$$2NaOH + H_2SO_4 = Na_2SO_4 + 2H_2O$$

The use of $A$ to indicate the theoretical excess of sulfuric acid beyond that needed to carry the above indicated reactions to completion does not means that when $A$ is zero (as in Examples 20–22) the reaction mixture is at pH 7; the pH of such a mixture will be less than 7. This is because the reactions taking place are not those cited above, but correspond more closely to the following equations, in which sodium silicate is represented as $Na_2SiO_3$, and its corresponding weak acid as $H_2SiO_3$:

$$Na_2SiO_3 = 2Na^+ + SiO_3^{-2}$$

$$SiO_3^{-2} + H_2O = HSiO_3^- + OH^-$$

$$HSiO_3^- + H_2O = H_2SiO_3 + OH^-$$

The concentration of hydroxide ion in the sodium silicate solution before addition of sulfuric acid will be determined by the extent to which the last two equilibria lie to the right. Since $H_2SiO_3$ and $HSiO_3^-$ are weak acids, these equilibria cannot equal the extent of the first indicated reaction, which can be regarded as 100% complete. Therefore the concentration of the hydroxide ion from the last two indicated reactions cannot equal the concentration of sodium ion indicated in the first equation. Addition of an equivalent of acid per mole of sodium ion, then, will provide acid in excess of that required to neutralize the base present, and the resultant mixture will be acidic. Although the sodium silicate species present are more complex than $Na_2SiO_3$, the same reasoning applies.

A vessel which is sealed, open to the air, or equipped to allow reflux, and of any convenient size, can be used to contain the reaction mixture; stirring can be provided by any standard means. In general, 10 weight percent aqueous solution of acid is combined with a waterglass solution of suitable dilution, either all at once, or over the time that the mixture is being heated to within about 10 centigrade degrees of its boiling point at the prevailing pressure. The emulsifying agent can also be added at any time before this temperature is reached. Addition of about two drops of antifoam agent per liter of reaction mixture is convenient, but not necessary.

TABLE I

| Example Number | Millimoles $SiO_2$ per Liter | Millimoles $Na_2O$ per Liter (N) | Milli-equivalents $H_2SO_4$ per Liter $(2N+A)$ | A | Grams of Emulsifier per Liter |
| --- | --- | --- | --- | --- | --- |
| 1 | 680 | 202 | 1,630 | 1,226 | 80 |
| 2 | 680 | 202 | 1,020 | 616 | 33.3 |
| 3 | 488 | 145 | 1,820 | 1,530 | 44.6 |
| 4 | 455 | 135 | 1,360 | 1,090 | 44.5 |
| 5 | 455 | 135 | 1,360 | 1,090 | 33.3 |
| 6 | 390 | 116 | 1,700 | 1,468 | 55.6 |
| 7 | 366 | 109 | 1,820 | 1,602 | 49.1 |
| 8 | 341 | 102 | 1,630 | 1,426 | 80 |
| 9 | 341 | 102 | 1,530 | 1,326 | 100 |
| 10 | 341 | 102 | 1,530 | 1,326 | 90 |
| 11 | 288 | 86 | 1,620 | 1,448 | 52.6 |
| 12 | 286 | 85 | 1,610 | 1,440 | 58 |
| 13 | 273 | 81 | 1,630 | 1,468 | 60 |
| 14 | 244 | 73 | 1,820 | 1,674 | 44.6 |
| 15 | 227 | 68 | 1,700 | 1,564 | 30.6 |
| 16 | 227 | 68 | 1,700 | 1,564 | 6.1 |
| 17 | 227 | 68 | 850 | 714 | 30.6 |
| 18 | 227 | 68 | 850 | 714 | 5.6 |
| 19 | 227 | 68 | 140 | 4 | 27.8 |
| 20 | 227 | 68 | 136 | 0 | 6.1 |
| 21 | 227 | 68 | 136 | 0 | 2.8 |
| 22 | 227 | 68 | 136 | 0 | 1.4 |
| 23 | 225 | 67 | 1,840 | 1,706 | 55.6 |
| 24 | 189 | 56 | 1,810 | 1,698 | 44.5 |
| 25 | 183 | 55 | 1,820 | 1,710 | 44.6 |
| 26 | 183 | 55 | 871 | 761 | 42.5 |
| 27 | 151 | 45 | 1,810 | 1,720 | 44.4 |
| 28 | 151 | 45 | 1,810 | 1,720 | 35.5 |
| 29 | 151 | 45 | 910 | 820 | 44.5 |
| 30 | 109 | 33 | 1,820 | 1,754 | 44.6 |
| 31 | 81 | 24 | 1,920 | 1,872 | 23.6 |

The initial reaction mixture is usually clear, but can be cloudy if reactant concentrations are high. As the mixture is heated and stirred, oily droplets form at a temperature characteristic of the particular mixture, and then harden to substantially spherical particles. The temperature must, of course, exceed that at which the oily droplets form, but any higher temperature up to the boiling point at the prevailing pressure is suitable; in general, it is convenient to allow the reaction mixture to boil gently. The time required to complete the reaction is dependent on the reactant concentrations and the temperature, but a time of from about one minute to about twelve hours is usually sufficient. Addition of a neutral salt such as sodium chloride to the reaction mixture can increase the rate at which the droplets harden, but the advantage is not substantial. After the beads have formed, they can be removed from the residual reaction mixture by mechanical separation procedures such as decantation or filtration, optionally washed with water and/or organic solvents, and dried at room temperature or at elevated temperatures.

The yield of beads varied from about 5% to about 90%, based on the theoretical silica used, and decreased with lowered reactant concentration; the beads were from about 1 micron to about 1 millimeter in diameter. The beads as they were obtained directly from the reaction mixture contained emulsifier. Thus, a sample prepared from a mixture corresponding to Example 27 and subsequently washed with water analyzed 12.25% Si, 44.2% C, 7.09% H, and 36.46% O (by difference). Beads similarly prepared were subsequently washed with acetone and air dried; these analyzed 39.15% Si, 2.92% C, 2.05% H, and 55.88% O. The residual carbon and hydrogen can be removed completely by heating the beads at 500° to 1000° C. for a time of over one hour. A sample of beads prepared using the concentrations shown for Example 9, and subsequently heated several hours at 900° C., gave an X-ray diffraction pattern for amorphous silica. The sample was then re-heated to 1450° C. for one and one-half hours, and the resultant beads showed the X-ray diffraction pattern for alpha-crystobalite. A sample of beads prepared using the concentrations of reactants shown for Example 28 was found to have a surface area of 378 meters² per gram, and a pore volume of 0.24 centimeters³ per gram.

In a typical experiment, in which the reactant concentrations corresponded to those cited for Example 27, 70 grams of a nonylphenyl ether of polyethylene glycol, 1400 ml. of 10% (weight) sulfuric acid, 140 ml. of water, and 35 ml. of 42° Bé. sodium (1:3.36) silicate were stirred by means of a magnetic stirrer in a 2-liter beaker. The resultant clear mixture was heated to 60° C., whereupon oily droplets formed. Heating was continued to 80° C., and the mixture was held at 80–85° C. for about 40 minutes to allow the droplets to harden. The resultant beads were separated from the residual reaction mixture by decantation, washed with water, air dried, heated at 110° C. for 1.5 hours, and cooled to give 42 grams of clear, uniform beads, about 0.05 mm. in diameter.

An experiment was performed by the detailed procedure already described in which no emulsifier was used, the other constituents being present in the concentrations shown for Examples 9 and 10. No oily droplets or beads were obtained.

*Examples 32–39*

The concentrations of constituents used in experiments corresponding to Examples 32–39 are shown in Table II. These examples illustrates the use of acids other than sulfuric acid. The detailed procedure corresponds to that already described, and the yields and sizes of the products are those already noted. The emulsifier used was a nonylphenyl ether of polyethylene glycol.

*Examples 40 and 41*

The reactant concentrations recorded in Table III were achieved by combining water, sulfuric acid, 42° Bé. sodium (1:3.36) silicate and emulsifier in the specific manner indicated above. To the reaction mixture corresponding to Example 40 was added kaolin in a concentration equivalent to 5.6 grams of kaolin per liter of initial reaction mixture. The resultant mixture was subsequently treated as previously described, and the beads thus obtained were removed by filtration, air dried, and heated at 1000° C. for about one hour. The analysis of the clear beads thus obtained was 84.9% $SiO_2$, and 14.09% $Al_2O_3$. To separate samples of reaction mixtures corresponding to Example 41 were added 4.4 grams of kaolin per liter of reaction mixture (Example 41a), and 4.4 grams of ignited alumina per liter of reaction mixture (Example 41b). Each of the resultant products was air dried, and then heated at 500° C. until clear. The product thus obtained from Example 41a analyzed as 82.5% $SiO_2$ and 17.2% $Al_2O_3$; the surface area was 378 meters² per gram. Example 41b analyzed as 83.8% $SiO_2$ and 15.2% $Al_2O_3$; the surface area was 291 meters² per gram.

TABLE II

| Example Number | Millimoles $SiO_2$ per Liter | Millimoles $Na_2O$ per Liter (N) | Milliequivalents of Acid per Liter (2N+A) | A | Grams of Emulsifier per Liter |
|---|---|---|---|---|---|
| 32 | 500 | 149 | 3,650 HCl | 3,352 | 44.5 |
| 33 | 500 | 149 | 2,440 HCl | 2,142 | 44.5 |
| 34 | 500 | 149 | 1,220 HCl | 1,922 | 44.5 |
| 35 | 226 | 68 | 2,280 HCl | 2,144 | 55.6 |
| 36 | 227 | 68 | 928 $HNO_3$ | 792 | 55.5 |
| 37 | 227 | 68 | 1,390 $HC_2H_3O_2$ | 1,254 | 55.5 |
| 38 | 227 | 68 | 1,850 $H_2C_2O_4$ | 1,714 | 55.5 |
| 39 | 151 | 45 | 2,440 HCl | 2,350 | 44.4 |

TABLE III

| Example Number | Millimoles $SiO_2$ per Liter | Millimoles $Na_2O$ per Liter (N) | Milliequivalents $H_2SO_4$ per Liter (2N+A) | A | Grams of Emulsifier per Liter |
|---|---|---|---|---|---|
| 40 | 227 | 68 | 1,700 | 1,564 | 55.6 |
| 41 | 151 | 45 | 1,810 | 1,720 | 35.5 |

As will be evident to those skilled in the art, modifications of this invention can be made or followed in the light of the foregoing disclosure without departing from the spirit and scope of the disclosure or from the scope of the claims.

We claim:

1. A method for forming solid, substantially spherical particles, the method comprising the steps of (1) combining particle-forming ingredients comprising (a) water, (b) a compound of the formula $xR_2O \cdot ySiO_2$, wherein R is an alkali and $x/y$ is greater than 0.24, in a concentration equivalent to about 50 millimoles to 800 millimoles of $SiO_2$ per liter, (c) (2N+A) milliequivalents of acid per liter where N is the number of millimoles of $R_2O$ per liter and A is from 0 to about 4000, in which the foregoing reactant concentrations are expressed as theoretical concentrations prior to reaction, and (d) from about 1 to 150 grams per liter of an emulsifying agent to form a mixture in which said ingredients are in a single liquid aqueous phase, and (2) agitating the resultant mixture at temperatures in the range from about 80° C. below its boiling point to about its boiling point at the prevailing pressure for a time of from about 1 minute to 12 hours to provide a plurality of said spherical particles.

2. A method for forming solid, spherical particles which comprises (1) combining water, a compound of the formula $xR_2O \cdot ySiO_2$, wherein R represents an alkali metal, and $x/y$ is greater than 0.24, in a concentration equivalent to about 100 millimoles to 500 millimoles of $SiO_2$ per liter, (2N+A) milliequivalents of acid per liter, where N is the millimoles of $R_2O$ per liter, and A is from 0 to 2500, in which the foregoing reactant concentrations are expressed as theoretical concentrations prior to reaction, from 1 to 100 grams per liter of an emulsifying agent, and from 0 to about 10 grams per liter of a compound of aluminum, based on the volume of the total reaction mixture, to form a mixture in which is a single liquid aqueous phase and (2) agitating the resultant mixture at temperatures in the range of from about 80° C. below its boiling point to about its boiling point at the prevailing pressure for a time of from about 1 minute to 12 hours.

3. A method comprising the steps of (1) combining particle forming ingredients comprising (a) water, (b) a compound of the formula $xR_2O \cdot ySiO_2$, wherein R represents an alkali metal, and $x/y$ is greater than 0.24, in a concentration equivalent to about 150 millimoles to 250 millimoles of $SiO_2$ per liter, (c) (2N+A) milliequivalents of acid per liter, where N is the millimoles of $R_2O$ per liter, and A is from 1000 to 2000, in which the foregoing reactant concentrations are expressed as theoretical concentrations prior to reaction, (d) from 30 to 50 grams per liter of an emulsifying agent, and (e) from 0 to 8 grams per liter of a compound which contains aluminum and oxygen to form a mixture in which said ingredients are in a single liquid aqueous phase, and (2) stirring the resultant mixture at temperatures in the range of from 80° C. below its boiling point to its boiling point at the prevailing pressure for a time of from about 30 minutes to about 90 minutes to thereby form droplets which in turn solidify to form substantially spherical particles.

4. A method for forming solid, substantially spherical particles of silica from a single liquid aqueous phase, the method comprising (1) combining water, a compound of the formula $xR_2O \cdot ySiO_2$, wherein R represents an alkali metal, and $x/y$ is greater than 0.24, in a concentration equivalent to about 150 millimoles to 250 millimoles of $SiO_2$ per liter, $(2N+A)$ milliequivalents of acid per liter, where N is the millimoles of $R_2O$ per liter, and A is from 1000 to 2000, in which the foregoing reactant concentrations are expressed as theoretical concentrations prior to reaction, and from 30 to 50 grams per liter of an emulsifying agent to form a mixture having a single liquid aqueous phase, and (2) stirring the resultant mixture at a temperature of from about 80° C. below its boiling point to about its boiling point at the prevailing pressure for a time of about 30 minutes to 90 minutes to form said spherical particles.

5. A method for forming solid, substantially spherical particles which comprises combining water, a compound of the formula $xR_2O \cdot ySiO_2$, wherein R represents an alkali metal, and $x/y$ is greater than 0.24, in a concentration equivalent to about 220 millimoles to 230 millimoles of $SiO_2$ per liter, $(2N+A)$ milliequivalents of acid per liter, where N is the millimoles of $R_2O$ per liter, and A is from 1200 to 1600, in which the foregoing reactant concentrations are expressed as theoretical concentrations prior to reaction, from 50 to 60 grams per liter of an emulsifying agent, and from 3 to 7 grams per liter of a compound which contains aluminum and oxygen, to form a mixture thereof that is a single liquid aqueous phase, and stirring the resultant mixture at temperatures in the range of from 80° C. below its boiling point to its boiling point at the prevailing pressure for a time of from about 30 minutes to about 90 minutes, to form oily droplets that in turn solidify to provide said spherical particles.

6. A method for forming solid, substantially spherical particles, the method consisting essentially of the steps of combining water, a compound of the formula $xR_2O \cdot ySiO_2$, wherein R represents an alkali metal, and $x/y$ is greater than 0.24, in a concentration equivalent to about 145 millimoles to 155 millimoles of $SiO_2$ per liter, $(2N+A)$ milliequivalents of acid per liter, where N is the millimoles of $R_2O$ per liter, and A is from 1600 to 1800, in which the foregoing reactant concentrations are expressed as theoretical concentrations prior to reaction, from about 30 to 40 grams per liter of an emulsifying agent, and from about 3 to 7 grams per liter of a compound which contains aluminum and oxygen, to form a mixture that is a single liquid aqueous phase, and stirring the resultant mixture at temperatures in the range of from about 80° C. below its boiling point to its boiling point at the prevailing pressure for a time of from about 30 minutes to about 90 minutes to form oily droplets that solidify to provide said spherical particles.

7. A method for forming solid, substantially spherical particles, the method comprising the steps of combining water, a compound of the formula $xNa_2O \cdot ySiO_2$, wherein $x/y$ is greater than 0.24, in a concentration equivalent to about 50 millimoles to 800 millimoles of $SiO_2$ per liter, $(2N+A)$ milliequivalents of acid per liter, where N is the millimoles of $Na_2O$ per liter, and A is from 0 to 4000, in which the foregoing reactant concentrations are expressed as theoretical concentrations prior to reaction, from about 1 to 150 grams per liter of an emulsifying agent, and from 0 to 10 grams per liter of a compound of alumina, based on the volume of the total reaction mixture, to form a mixture that is a single liquid aqueous phase, and agitating the resultant mixture at temperatures in the range of from 80° C. below its boiling point to its boiling point at the prevailing pressure for a time of from 1 minute to about 12 hours to form droplets that solidify to provide the spherical particles.

8. A method comprising the steps of (1) mixing water, a compound of the formula $xNa_2O \cdot ySiO_2$, wherein $x/y$ is greater than 0.24, in a concentration equivalent to about 100 millimoles to 400 millimoles of $SiO_2$ per liter, $(2N+A)$ milliequivalents of sulfuric acid per liter, where N is the number of millimoles of $Na_2O$ per liter and A is from 0 to 2000, in which the foregoing reactant concentrations are expressed as theoretical concentrations prior to reaction, from about 1 to 80 grams per liter of a water-soluble emulsifying agent, and from 0 to 6 grams per liter of a compound which contains aluminum and oxygen, to form a mixture in which said compound, water and acid are in a single liquid aqueous phase, and (2) stirring the resultant mixture at temperatures in the range of from about 80° C. below its boiling point to about its boiling point at the prevailing pressure for a time about 1 minute to 12 hours to form droplets which in turn harden to form substantially spherical particles.

9. A method comprising the steps of (1) mixing particle-forming ingredients comprising (a) water, (b) a compound of the formula $xNa_2O \cdot ySiO_2$, wherein $x/y$ is greater than 0.24, in a concentration equivalent to about 150 millimoles to 155 millimoles of $SiO_2$ per liter, (c) $(2N+A)$ milliequivalents of acid per liter, where N is the millimoles of $Na_2O$ per liter, and A is from 1500 to 1800, in which the foregoing reactant concentrations are expressed as theoretical concentrations prior to reaction, and (d) from about 35 to 45 grams per liter of a water-soluble emulsifying agent, based on the volume of the total reaction mixture, to form a mixture in which said ingredients are in a single liquid aqueous phase, and (2) agitating the resultant mixture in said single aqueous phase at temperatures in the range of from 80° C. below its boiling point to its boiling point at the prevailing pressure for a time of from about 30 minutes to about 90 minutes to form solid, substantially spherical particles.

10. A method for forming solid, substantially spherical particles which comprises (1) combining water, a compound of the formula $Na_2O \cdot 3.36SiO_2$, in a concentration equivalent to about 150 millimoles to 155 millimoles of $SiO_2$ per liter, $(2N+A)$ milliequivalents of sulfuric acid per liter, where N is the millimoles of $Na_2O$ per liter, and A is from 1500 to 1800, in which the foregoing reactant concentrations are expressed as theoretical concentrations prior to reaction, and from about 35 to 45 grams per liter of an emulsifying agent, based on the volume of the total reaction mixture, to form a mixture in which said water, said compound, said acid and said agent are in a single liquid aqueous phase, and (2) mixing the resultant mixture in said single aqueous phase at temperatures in the range of from 80° C. below its boiling point to its boiling point at the prevailing pressure for a time of from about 30 minutes to about 90 minutes to provide the solid, spherical particles.

11. A method for forming solid, substantially spherical particles which comprises combining water, a compound of the formula $Na_2O \cdot 3.36SiO_2$, in a concentration equivalent to about 80 millimoles to 90 millimoles of $SiO_2$ per liter, $(2N+A)$ milliequivalents of suluric acid per liter, where N is the millimoles of $Na_2O$ per liter, and A is from 1200 to 1600, in which the foregoing reactant concentrations are expressed as theoretical concentrations prior to reaction, and from about 50 to 60 grams per liter of nonylphenyl ether of polyethylene glycol based on the volume of the total reaction mixture, to form a mixture that is a single liquid aqueous phase, and stirring the resultant mixture at temperatures in the range of from 80° C. below its boiling point to its boiling point at the prevailing pressure for a time of from about 30 minutes to about 90 minutes to form droplets which in turn solidify to form the spherical particles.

12. A method for forming solid, substantially spherical particles which comprises combining water, a compound of the formula $Na_2O \cdot 3.36SiO_2$, in a concentration equivalent to about 220 millimoles to 230 millimoles of $SiO_2$ per liter, $(2N+A)$ milliequivalents of sulfuric acid per liter, where N is the milimoles of $Na_2O$ per liter, and A is from 1200 to 1600, in which the foregoing reactant concentrations are expressed as theoretical concentrations prior to reaction, from 50 to 60 grams per liter of nonylphenyl ether of polyethylene glycol, and from 3 to 7 grams per liter of kaolin, based on the volume of the total reaction mixture, to form a mixture in which the water, the compound and the acid are in a single aqueous phase, and stirring the resultant mixture at temperatures in the range of from 80° C. below its boiling point to its boiling point at the prevailing pressure for a time of from about 30 minutes to about 90 minutes to form the spherical particles.

References Cited by the Examiner

UNITED STATES PATENTS 2,454,942 11/1948 Pierce et al. _____ 252—448 XR
2,782,869 2/1957 Gray _____ 23—182 XR OSCAR R. VERTIZ, *Primary Examiner.*

MAURICE A. BRINDISI, *Examiner.*

H. S. MILLER, R. M. DAVIDSON, *Assistant Examiners.*